United States Patent [19]

Berg et al.

[11] 3,945,978

[45] Mar. 23, 1976

[54] PROCESS FOR THE PRODUCTION OF POURABLE, PULVERULENT FILLER MIXTURES CONTAINING PLASTICIZER OILS

[75] Inventors: Gerhard Berg; Karl-Heinz Nordsiek; Egge Barnstedt, all of Marl, Germany

[73] Assignee: Chemische Werke Huels Aktiengesellschaft, Marl, Germany

[22] Filed: May 10, 1974

[21] Appl. No.: 468,669

[30] Foreign Application Priority Data

May 12, 1973 Germany............................ 2324009

[52] U.S. Cl...... 260/33.6 AQ; 252/525; 260/29.7 T; 260/29.7 GP; 260/29.7 EM; 260/29.7 N; 260/29.7 PT; 260/33.6 A; 260/34.2; 260/42.55; 260/42.57; 260/584 B
[51] Int. Cl.²........................ C08K 5/01; C08J 3/20
[58] Field of Search 260/29.7 T, 29.7 GP, 29.7 EM, 260/29.7 N, 29.7 PT, 33.6 AQ, 42.55, 42.57, 584 B, 33.6 A, 34.2; 252/525

[56] References Cited
UNITED STATES PATENTS

| | | | |
|---|---|---|---|
| 2,979,528 | 4/1961 | Lundsted........................ | 260/584 B |
| 3,338,729 | 8/1967 | Ruoho................................ | 106/307 |
| 3,340,080 | 9/1967 | Henderson........................ | 106/307 |
| 3,706,676 | 12/1972 | Franke et al................... | 260/584 B |
| 3,846,365 | 11/1974 | Berg et al................... | 260/33.6 AQ |

*Primary Examiner*—Donald E. Czaja
*Assistant Examiner*—H. H. Fletcher
*Attorney, Agent, or Firm*—Millen, Raptes & White

[57] ABSTRACT

A process for the manufacture of a pourable, pulverulent rubber-filler mixture containing plasticiser oil, by combining a filler containing plasticiser oil with an aqueous emulsion of a rubber solution, and precipitating and drying the mixture, wherein the plasticiser oil is adsorptively bound on the finely divided active filler in an amount of from 1 to 100 parts by weight, relative to 100 parts by weight of the filler, the premix thus obtained, which continues to be free-flowing and pulverulent, and consists of filler charged with plasticiser oil, is dispersed in water in the presence of an emulsifier, the resulting dispersion is intimately mixed with an aqueous emulsion of a synthetic rubber solution, this mixture is introduced into an aqueous precipitation bath which is at a temperature of from 40 to 95°C and contains waterglass or an acid and waterglass, and from the mixture treated in this way the rubber-filler mixture, containing plasticiser oil, is precipitated with simultaneous stripping-off of the rubber solvent, and is separated from the water and dried.

13 Claims, No Drawings

PROCESS FOR THE PRODUCTION OF POURABLE, PULVERULENT FILLER MIXTURES CONTAINING PLASTICIZER OILS

BACKGROUND OF THE INVENTION

This invention relates to the preparation of discrete, pourable, finely divided, tack-free plasticized filler particles and a method for the preparation thereof. More particularly, this invention relates to the use of such particles as fillers in the preparation of pourable, pulverulent rubber compounds having such characteristic properties.

The processing of rubbers is normally a multistage procedure. In contrast to the manufacture of molded components from thermoplastic synthetic resins, it is absolutely necessary, prior to the final shaping step, to conduct a generally complicated mixing process to obtain homogeneous incorporation of diverse additives prior to the cross-linking reaction. The high viscosity of the raw materials and their handling in bale form makes it necessary to utilize heavy machines, e.g. rolling mills or internal mixers, which perforce require a high energy consumption. The inherent considerable costs of such energy and equipment greatly impair the economy of the production of elastomeric materials.

Therefore, many efforts are now being directed toward adapting rubber technology to the principles of thermoplastic processing. An ideal starting point to attain this objective is rubbers in pulverulent form. Starting with the advantageous possibilities afforded in transportation and storage, the provision of automated feeding and conveying devices promises considerable savings in the feeding of mixing-and-deformation units. In order to incorporate additional ingredients, powder mixing plants can be utilized, which operate under very much more economical conditions. Thus, a continuous processing technique employing a high degree of automation has moved into the realm of possibility for the rubber industry.

In order to put the above-described ideas into practice, several methods which appeared suitable for the production of corresponding pulverulent rubber substances have been developed. Thus, German Unexamined Laid-Open Application DOS No. 2,135,266 and corresponding U.S. Pat. No. 3,846,365, the contents of which are incorporated by reference herein, disclose a process according to which discrete, finely divided, tack-free pourable elastomer particles are prepared from a filler-containing aqueous elastomer emulsion containing an aqueous emulsion of an elastomer dissolved in a volatile inert organic solvent having an emulsifying amount of quaternary ammonium salt cationic surfactant and an aqueous suspension or dispersion of a solid, finely divided elastomer filler, which process comprises gradually introducing the filler-containing aqueous elastomer emulsion into an aqueous alkali silicate solution while maintaining the solution at a pH greater than 2 and simultaneously evaporating the organic solvent to form discrete, finely divided, tack-free elastomer particles. The process can be applied to solid elastomers or to post-polymerization elastomer solutions, and is particularly suitable for preparing pourable carbon black-containing elastomer particles to be directly formed into shaped objects by molding, extrusion, etc.

It has furthermore been suggested in German Pat. Application No. P 22 14 121.5 and corresponding U.S. Pat. No. 3,895,035, the contents of which are incorporated by reference herein, to produce pourable, pulverulent rubber mixtures by emulsifying rubber solutions, optionally containing mineral oil plasticizers, in water in the presence of alkylamine oxyalkylates; introducing into these emulsions suspensions of solid fillers, preferably carbon blacks, optionally containing emulsifiers; continuously introducing the filler-containing, aqueous emulsions of the rubber solutions into hot aqueous alkali silicate solution, wherein the pH during the entire precipitation step ranges between 0.1 and 7, preferably between 1.0 and 3.5; simultaneously and continuously distilling off the rubber solvent; separating the thus-obtained, finely divided filler-containing rubber mixture from the water; and drying the product.

Another process for preparing pourable, filler-containing elastomer particles is described in U.S. Pat. No. 3,902,604, the contents of which are also incorporated by reference herein, wherein an admixture of a rubber solution and filler is flash-evaporated. As with the above and other processes, pourable, filler-containing elastomer particles amenable to thermoplastic processing techniques are obtained. Especially valuable elastomers for use in such processes are the stereo block homopolymers of butadiene prepared according to the adiabatic polymerization process with lithium catalysts according to the techniques of U.S. Pat. No. 3,829,409, the contents of which are also incorporated by reference herein.

The primary objective of these processes is to obtain pourable, pulverulent rubber-filler mixtures wherein the customary homogenization of rubbers with fillers during the course of the processing operation is entirely eliminated. For certain important sectors of the rubber industry, especially tire manufacturing, it is advantageous if the rubber mixtures to be processed already contain the plasticizer provided as a further rubber constituent. In accordance with the above-described processes, the plasticizer can be immediately incorporated, to obtain pulverulent, pourable rubber mixtures. However, the pourable, pulverulent rubber-filler mixtures, containing plasticizer oil prepared according to this method exhibit a tendency toward adhesion with increasing additions of plasticizer oil, caused by the low-molecular weight hydrocarbon mineral oil plasticizer component. This leads to a clearly visible impairment of the pourability, as compared to otherwise identical rubber mixtures which are free of plasticizer oil. This phenomenon can become a very serious problem at high plasticizer oil dosages (40 parts by weight and thereabove, based on the rubber) during the handling of such pulverulent rubber mixtures. Thus, when dispensing the rubber mixtures from storage vessels or ensilage tanks, an irregular flow is observed, which can manifest itself in a surge-type discharge. This behavior is due, inter alia, to the fact that the pulverulent rubber mixtures containing plasticizer oil form a well during their discharge from the funnel-shaped vessels and then break off in chunks. Also, the notorious bridge formations within the storage tanks result in a nonuniform pouring of the rubber mixtures. These phenomena often lead to serious difficulties in the charging of processing machines.

OBJECTS OF THE INVENTION

Accordingly, it is a general object of this invention to provide a process for circumventing the aforementioned disadvantages in a maximally simple and economical manner.

Another object of this invention is to provide a process for the preparation of constantly pourable, pulverulent rubber-filler mixtures of an improved quality.

A further object of this invention to provide a process for preparing discrete, finely divided, pourable and tack-free filler particles containing mineral oil plasticizer which exhibit the same rheological properties as the filler alone, and the particles thus-produced.

An additional object of this invention is to provide an improved process for preparing discrete, finely divided, tack-free and pourable elastomer particles containing a filler and mineral oil plasticizer.

A more particular object of this invention is to provide such elastomer particles which exhibit improved storage and rheological properties.

Other objects and advantages of this invention will become apparent to those skilled in the art upon further study of the specification and appended claims.

SUMMARY OF THE INVENTION

Briefly, the above and other objects are attained in one aspect of this invention by providing a process for preparing pourable, pulverulent rubber-filler mixtures containing a plasticizer oil, by combining fillers containing plasticizer oil with aqueous emulsions of rubber solutions, precipitation, and drying of the mixtures, characterized in that the plasticizer oil is absorptively bound to the finely divided active fillers, preferably carbon blacks, in amounts of 1–100 parts by weight based on 100 parts by weight of the filler, preferably under fluidization; the thus-obtained, still pourable and pulverulent premix of plasticizer-oil-laden fillers is dispersed in water in the presence of emulsifiers; these dispersions are intimately mixed with aqueous emulsions of elastomer solutions; this mixture is introduced into an aqueous precipitant bath, containing sodium silicate at temperatures of between 40° and 95°C.; the plasticizer-oil-containing rubber-filler mixture is precipitated from this thus-treated mixture while simultaneously removing the rubber solvent; and the mixture is separated from the water and dried.

DETAILED DISCUSSION

It has now been found possible to obtain pourable, pulverulent rubber-filler mixtures containing plasticizer oil by combining fillers which contain plasticizer oil with aqueous emulsions of rubber solutions, precipitation and drying of the mixtures employing the combination of features critical to the process as set foth herein.

Preferred fillers within the scope of the process of this invention are the carbon blacks customary in the rubber industry, wherein carbon blacks of all activity stages can be utilized. Suitable carbon blacks include but are not limited to SAF (super abrasion furnace), ISAF (intermediate super abrasion furnace), HAF (high abrasion furnace), FEF (fast extruding furnace) and MT (medium thermal) carbon blacks. In place of or addition thereto, light-colored fillers can also be used, e.g. highly active silicic acid, kaolin, ground slate, etc. The amount of carbon black to be employed is 40–500% by weight, preferably 50–150% by weight, based on the solid rubber. The amount of light-colored fillers ranges between 20 and 500% by weight, preferably between 40 and 150% by weight, based on the solid rubber. Combinations of carbon black with light-colored fillers, preferably silicic acid, are also possible.

Suitable mineral oil plasticizers are the refinery products usually employed for this purpose which, depending on their application, can comprise chiefly aromatic, naphthenic, and/or paraffinic hydrocarbons. The amount of plasticizer oil to be used ranges between 1 and 100% by weight, preferably between 30 and 60% by weight, based on the filler.

According to the present invention, the plasticizer oil is first bound by adsorption to the finely divided active fillers in order to prepare a homogeneous premix, e.g. by fluidizing and intermixing both components suitably in a fluidized bed, e.g. such as is produced by a powder mixer (optionally of the Henschel type). During this process, the filler is first provided and, after initiating the rotor and attaining a high speed of more than 1,000 r.p.m., the plasticizer oil, preheated to achieve the desired viscosity, is added dropwise within a few minutes. Coagulations temporarily produced upon contact of the plasticizer oil droplets with carbon black are immediately broken up. In accordance with a particularly advantageous embodiment, the plasticizer oil is introduced in finely divided form into the charged filler by means of a special nozzle from the topside of the vessel; alternatively, the oil can be added to the filler by atomization with an inert gas through such nozzle.

After the total amount of mineral oil plasticizer has been added, the rotor of the mixer is advantageously allowed to run at full speed for a short period of time. The premix of fillers, preferably carbon blacks, laden with plasticizer oil surprisingly appears to be entirely unchanged in its external phase and still exhibits genuine powder properties in the distribution inherently characteristic of the carbon black, which ranges to dust-fine, without an adverse effect on pourability and without any tendency toward adhesion and caking.

The fillers laden in this way with plasticizer oil, especially carbon blacks, are then dispersed in water in the presence of emulsifiers.

Suitable dispersing devices are, for example, special agitators, mills, ultrasonic appliances and mixing nozzles. The emulsification step takes place in most cases at room temperature. However, it may be advantageous in certain instances to operate at temperatures of up to 200°C. and under a pressure above atmospheric pressure, which is recommended particularly when using highly viscous solutions, as they are obtained, for example, in the adiabatic Li-polymerization of butadiene described in the aforementioned U.S. Pat. No. 3,829,409.

Suitable emulsifiers within the scope of the process of this invention are amine surfactants. Preferably, alkylamine oxyethylates of the general formula below are utilized:

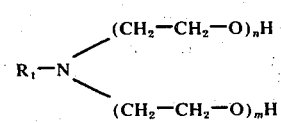

wherein $R_1$ represents alkyl and alkenyl groups of 1–30 carbon atoms, preferably 10–20 carbon atoms, and $n$ and $m$ are integers between 1 and 80, preferably between 6 and 20.

Suitable compounds are, for example, lauryl-, myristyl-, cetyl-, stearyl-, and oleylamine oxyethylates. These emulsifiers are generally used in an alkaline aqueous solution at pH values of 7–14, preferably 10–13, in quantities of 0.05 – 2% by weight, preferably 0.1 – 1% by weight, based on the rubber solution.

The filler particles absorbed with a mineral oil plasticizer can be employed for all purposes requiring the use of filler and plasticizer, e.g. the preparation of masterbatches in elastomer processing. The particles are especially valuable for use in the elastomer precipitation process of U.S. Pat. No. 3,846,365.

Suitable rubber materials within the scope of the elastomer precipitation process of this invention are preferably elastomeric polymers produced by solution polymerization, e.g. the polymers obtained by the homopolymerization of butadiene or the copolymerization of butadiene with styrene in the presence of lithium catalysts, wherein the butadiene proportion in the polybutadiene has a 1,2-vinyl content of 8–50%. Furthermore suitable are all EMP (ethylene-propylene monomer) and EPDM (ethylene-propylene diene monomer) polymers.

In accordance with a particularly advantageous embodiment of the present process, rubbers are utilized which are obtained by the adiabatic polymerization of butadiene in the presence of a solvent and a catalyst system of organolithium compounds on the one hand, and Lewis bases on the other hand, and which comprise polybutadiene having vinyl group proportions of between 25 and 50%.

In order to obtain the rubber-filler mixtures containing plasticizer oil, the aqueous dispersions of the premixes of fillers laden with plasticizer oil are intimately mixed with aqueous emulsions of the rubber solutions in the desired quantitative ratio. This mixture is then introduced into an aqueous precipitant bath of sodium silicate solution and/or a mixture of sodium silicate solution and acid at temperatures of between 40° and 95°C. The residence time of the precipiated rubber-filler mixture containing plasticizer oil in the precipitation stage ranges, depending on the mode of operation, between 5 seconds and 60 minutes. The precipitation step is conducted, for example, by introducing the mixture into an agitator-equipped vessel wherein the aqueous precipitant liquid — depending on the emulsifier system either 0.25–6 moles of sodium silicate per mole of emulsifier, or dilute sulfuric acid in amounts of 1–20 moles, especially 2–10 moles per mole of emulsifier — is provided in combination with sodium silicate in amounts of 0.25 – 6 moles of $SiO_2$, preferably 1–4 moles of $SiO_2$ per mole of emulsifier.

The aqueous precipitant liquid is maintained at temperatures of 40°–95°C., preferably 50°–65°C., wherein pressures are ambient of 0.5 – 3 atmospheres absolute, preferably 0.7 – 1.2 atmospheres absolute. While the rubber-filler mixture containing plasticizer oil is obtained in a very finely divided form, the particle diameters being between 10 and 2,000μ, the evaporating solvent-water mixture flows off through a vapor outlet and is condensed in a heat exchanger. With this mode of operation, the residence time of the precipitated mixture in the precipitant bath is generally up to 60 minutes.

At temperatures of up to 95°C. and residence times of up tp 60 minutes, the plasticizer oils have a tendency to diffuse from the filler (especially the carbon blacks), into the ruber solution and/or into the rubber, thereby impairing the good pourability properties of the pulverulent rubber-filler mixtures containing plasticizer oil. Therefore, novel processing methods had to be developed.

In accordance with an improved mode of operation for reducing the residence times of the precipitated rubber-filler mixture in the precipitant bath and for avoiding the diffusion of the plasticizer oil from the filler into the rubber, the process of this invention is executed, in practice, advantageously in a hollow cylindrical vessel without internal parts in a continuous operation. Around the inlet nozzle for the dispersion mixture to be precipitated, several nozzles are arranged on the bottom of the container for the heating steam and the aqueous solutions of the precipitants. The aqueous solution of the precipitants charged into the vessle is first heated to temperatures of 40°–95°C., preferably 50°–65°C. The steam current produced upon the entrance of the dispersion mixtures into the vessel due to the evaporation of the solvent effects, while supported by the hot-steam stream, a liquid flow which rises in the axis of the vessel. Consequently, a circulating flow is produced in the vessel on the principle of a mammoth pump, wherein the liquid flows downwardly along the vessel wall. Since the fine particles of the precipitated rubber-filler mixtures containing plasticizer oil which are formed within the upwardly oriented liquid current, flow down along the vessel wall together with the liquid due to their greater density as compared to the aqueous solution, these particles can be discharged at the outer rim of the container bottom. In order to keep the precipitant concentration in the precipitant bath at a constant level, hot precipitant liquid is introduced in metered amounts through nozzles arranged around the inlet nozzle for the dispersion mixtures. According to this mode of operation, the precipitation takes place preferably at temperatures of 40°–65°C. and under pressures of 0.5 – 1.2 atmospheres absolute. The time period necessary for the evaporation of the solvent is determined chiefly by the level of liquid in the precipitation vessel; this period generally ranges between 5 and 6 seconds. The residence times of the rubber-filler mixtures containing plasticizer oil in the aqueous precipitant bath generally range from 2 to 5 minutes. The vapors simultaneously formed during the precipitation and simultaneous evaporation are conducted to a condenser via an outlet vent at the vessel lid.

In a further embodiment of the process for producing pourable rubber-filler mixtures containing plasticizer oil according to this invention, the mixture of the aqueous plasticizer oil - carbon black dispersion and the aqueous emulsion of the rubber solution is introduced, together with hot aqueous precipitant liquid, into a duct preferably having a rectangular or semicircular cross section. while the precipitated finely divided mixture flows through the duct, the evaporating solvent-water mixtures rises into a hood arranged above the duct and is removed therefrom to a condenser. The length of the duct can be varied as desired in this simple arrangement. However, this length must be dimensioned so that a residence time of the mixture to be precipitated is provided as required for the evaporation of the solvent; this residence time ranges between 5 and 60 seconds at temperatures of 40°–65°C. and pressures of 0.5 – 1.2 atmospheres absolute. After the dewatering and drying of the precipitated product, a pourable, pulverulent plasticized rubber - carbon black mixture is obtained.

The precipitated rubber-filler mixtures are freed of the main amount of water, for example, by filtration or decanting in accordance with conventional methods, e.g. on screens, rotary cellular filters, vacuum filters or centrifuges, and are dried according to conventional processes, e.g. in belt dryers, sieve-drum dryers, fluidized-bed or spray drying plants, as well as plate dryers, preferably under constant motion.

The rubber adjuvants additionally required besides the heretofore described components, such as antiaging substances, zinc oxide, stearic acid, as well as vulcanizing agents such as sulfur and vulcanization accelerators, can be dispersed in water together with the carbon black containing the plasticizer oil.

The pulverulent rubber-filler mixtures, containing plasticizer oil, according to this invention show markedly improved pouring characteristics in analytical tests. The pourability of the pulverulent rubber-filler mixtures is determined in accordance with the "efflux time" method, e.g. as described in ASTM Standards D 1895-69 and 1755-66. In this method, the time is determined wherein a certain mass of the powder flows out of a funnel having an opening angle of 40° and a lower aperture diameter of 10, 15, and 25 mm. The rubber-filler mixtures of this invention have the property of uniform flow, i.e., identical amounts of product result in reproducible flowing speeds under identical test conditions. In contrast thereto, the heretofore known pulverulent rubber-filler mixtures containing plasticizer oil have the property of very nonuniform and surge-like flow without the use of special auxiliary devices, whereby the efflux times are perforce increased and cannot be determined with accuracy. Precisely this nonuniform flow behavior occurring in free fall without special feeding devices can lead to difficulties in continuous and automated production employing a processing machine. With respect to this point, the pulverulent rubber-filler mixtures produced according to the process of this invention lead to a significant advance in the art.

The pourable, pulverulent rubber-filler mixtures containing plasticizer oil obtained according to the process of the present invention, especially the rubber - carbon black mixtures, are of great practical importance in the production of molded rubber articles of a great variety of types by the direct charging of the pulverulent, plasticizer-oil-containing mixtures in the extruder, in calenders, in transfer molding, as well as in automatic injection-molding machines. If auxiliary agents are to be admixed to these pulverulent rubber mixtures in the rubber processing plant, such mixing can be executed using maximally simple agitator systems, e.g. the "Loedige," "Papenmeier," or "Henschel" mixers. The pulverulent rubber mixtures which optionally contain various fillers and/or additives can now be utilized, in a surprisingly simple and economical manner, directly in the final stage of the usual rubber processing operation, i.e., in the molding or shaping process, while eliminating heretofore necessary heavy mechanical devices for the various mixing steps. The pulverulent, plasticizer-oil-containing rubber-filler mixtures are especially advantageous in the manufacture of tire treads. In this connection, the pulverulent mixtures of this invention offer advantageous conditions for the use of automatic conveying, metering and mixing devices, thus making it possible to change over from discontinuously operating large-scale plants to a continuous processing operation with reduced initial investment, energy, and personnel costs.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1 a. A Henschel mixer having a volume of 30 liters is filled at 20°–50°C. wall temperature with a 3,000 g. of HAF carbon black ("Corax 9"). After the rotor has been started up to a speed of 1600 r.p.m., 1764 g. of plasticizer oil ("Naftolen-MV"), preheated to 60°–80°C., is injected within 3 minutes in finely divided form through an inlet port provided with fine bores. After the addition of plasticizer oil is terminated, the rotor is allowed to operate for another 2 minutes in order to complete the distribution. After a total mixing time of 5 minutes, the carbon black - plasticizer oil mixture is obtained in the dustfine distribution inherently characteristic of the carbon black, without impairment of fluidity or pourability and without any tendency toward coalescing.

b. 4.05 kg. of this premix of carbon black and plasticizer oil is dispersed in 16.2 l. of water with the aid of an "Ultra-Turrax" emulsifying device in the presence of 121.5 g. of laurylamine oxyethylate (n + m = 12 in the general formula). The thus-obtained carbon black dispersion containing plasticizer oil is mixed with 60 kg. of an aqueous rubber-solution emulsion which is prepared according to the following process: 30 kg. of a 10% solution of a polybutadiene having a vinyl group content of 35% and a Mooney viscosity of 93, obtained by the adiabatic solution polymerization of butadiene with the aid of n-butyllithium as the catalyst with the addition of 1,2-dimethoxyethane in hexane, is emulsified in 29.82 l. of water with the aid of "Supraton" emulsifying device in the presence of 180 g. of laurylamine oxyethylate. The pH is set to 11.5 during the emulsifying step with 10% sodium hydroxide solution. The mixture of the aqueous carbon black - plasticizer oil dispersion prepared according to 1(a) and of the aqueous emulsion of the rubber solution is fed at a rate of 29 kg./h. into a cylindrical vessel having a volume of 150 l., containing a mixture of 29 l. of water, 24.3 g. of 26% aqueous sodium silicate and 102. g. of 10% strength sulfuric acid. The pH ranges between 1.5 and 2.0. The charged precipitant liquid had been preheated by saturated steam with a pressure of 1.5 atm. abs. to a temperature of 65°C.

Simultaneously with the mixture to be precipitated, saturated steam is supplied to the reaction mixture so that, under a pressure of 1.0 atm. abs., the temperature of the liquid phase is 61°C. The feeding of a mixture of 10% sulfuric acid, heated to 65°C., and sodium silicate solution is controlled so that the pH of the precipitant bath is constantly between 1.5 and 2. This corresponds to a use of 4 moles of sulfuric acid and 4 moles of $SiO_2$ as sodium silicate per mole of total emulsifier. The vaporous hexane-water mixture is conducted through a discharge nipple at the vessel lid to the condenser. The precipitated, finely divided rubber-filler mixture, containing plasticizer oil, is withdrawn via outlet nipples at the bottom of the vessel so that the level of the liquid in the precipitating vessel remains constant. The residence time of the finely divided mixture in the hot aqueous phase is 3–5 minutes. The finely divided rubber-filler mixture is vacuum-filtered and dried, thus obtaining a pourable rubber-filler powder.

EXAMPLE 2

50.4 kg. of HAF carbon black ("Corax 9") prepared according to Example 1 and containing plasticizer oil ("Naftolen-MV") is dispersed in 200.5 kg. of water containing 1.5 kg. of laurylamine oxyethylate and 1 kg. of 10% sodium hydroxide solution, with the aid of an "Ultra-Turrax-38 emulsifying device within 30 minutes. The resultant product is 253.4 kg. of a 20% carbon black - plasticizer oil dispersion, pH 12.7.

The carbon black - plasticizer oil dispersion is mixed with 745 kg. of an alkaline aqueous emulsion of the rubber solution obtained in the following manner: 372.5 kg. of a 10% solution of a polybutadiene with a vinyl group content 25% and a Mooney viscosity of 88, obtained by solution polymerization of butadiene with the aid of butyllithium in hexane, is emulsified with 370 l. of water with the aid of "Supraton" emulsifying device in the presence of 2.235 kg. of laurylamine oxyethylate. During the emulsification, 10% sodium hydroxide solution is pumped into the vessel until the pH is 12.0 to 12.5.

The admixture of the aqueous carbon black - plasticizer oil dispersion and the aqueous emulsion of the rubber solution is introduced at a rate of 29 kg./h. at the bottom of the inlet of a duct having the following construction:

The precipitating vessel comprises a duct having a rectangular cross-section, a width of the duct bottom of 15 cm., a height of 1 m., and a length of 5 m. Into this duct are charged 520 l. of water and sufficient sulfuric acid to adjust the pH of the aqueous phase to 2. By means of saturated steam of 1.5 atm. abs., the precipitant bath is preheated to a temperature of 65°C. The steam is introduced into the precipitant liquid via nozzles uniformly disposed over the length of the duct along the bottom thereof.

At the duct inlet, the hot precipitant bath is supplied, in addition to the mixture of carbon black - plasticizer oil dispersion and the aqueous emulsion of the rubber solution, with sufficient hot, dilute sulfuric acid to maintain the pH between 1.5 and 2 during the precipitation process. The steam supply is controlled so that the temperature in the liquid phase is 61°C. at a pressure of 1 atm. abs. The vapor-phase hexane-water mixture flows into a hood placed over the duct and is conducted from there into a condenser, via an outlet line. The thus-precipitated, finely divided rubber-filler mixture containing plasticizer oil flows through an outlet opening at the bottom of the duct end so that the liquid level in the duct remains constant. The residence time of the precipitated mixure in the hot aqueous phase is about 2.5 minutes. After filtering and drying the precipitated mixture, a well pourable, pulverulent rubber mixture is obtained.

EXAMPLE 3

(Comparative Example)

600 g. of plasticizer oil having a high aromatic content (commercial designation "Naftolen-MV") is stirred into 15 kg. of a 10% solution of a polybutadiene having a vinyl group content of 35% and a Mooney viscosity of 93, obtained by solution polymerization of butadiene with the aid of butyllithium and 1,2-dimethoxyethane in hexane. The rubber solution containing the plasticizer oil is emulsified with 15.5 l. of water with the aid of an "Ultra-Turrax" emulsifying device in the presence of 93.5 g. of laurylamine oxyethylate. At a pH of 8.9, 25.5 kg. of a 5% aqueous suspension of ISAF carbon black (commercial name "Corax 6") is stirred into the thus-obtained emulsion. This mixture is introduced under agitation into a vessel having a volume of 250 l., which had previously been charged with a mixture, heated to 90°–95°C., of 40.5 l. of water, 192 g. of 26% aqueous sodium silicate solution and 543 g. of 10% sulfuric acid, pH 2.0. The rubber mixture is precipitated in very finely divided form, while simultaneously the solvent hexane is distilled off. The pH of the precipitant bath rises from 1.8 to 2.3. After the hexane has been completely exhausted, the precipitated, finely divided mixture containing the plasticizer oil is vacuum-filtered and, after drying under vacuum at 75°C., is obtained as a pourable, non-tacky powder.

EXAMPLE 4

The rubber-filler mixtures, containing plasticizer oil, as produced in accordance with Examples 1, 2, and 3 are tested with respect to their pourability according to the efflux time method corresponding to ASTM - D 1895-69. The efflux times are measured, in seconds, of respectively 50 g. of powder from standardized funnels having an opening angle of 40° and a lower opening diameter of 10 mm., 15 mm., and 25 mm.

TABLE

| Rubber-Filler Mixture of | Test No. | Efflux Times in Seconds With an Opening Diameter of | | |
|---|---|---|---|---|
| | | 10 mm. | 15 mm. | 25 mm. |
| Example 1 | 1 | 18.0 | 4.8 | 1.6 |
| | 2 | 18.4 | 5.2 | 1.7 |
| | 3 | 17.9 | 4.9 | 1.8 |
| | 4 | 18.1 | 4.9 | 1.8 |
| Example 1 | 1 | 19.5 | 5.3 | 2.1 |
| | 2 | 18.7 | 4.9 | 1.9 |
| | 3 | 18.9 | 5.2 | 1.8 |
| | 4 | 19.2 | 5.1 | 2.0 |
| Example 3 | 1 | Nonuniform, surge-type discharge. No exact measuring values can be determined with any of the efflux times. | | |
| | 2 | | | |
| | 3 | | | |
| | 4 | | | |

It can clearly be seen from the table that the mixtures produced according to the present invention, as disclosed in Examples 1 and 2, show a uniformly reproducible pourability characteristic. The pourability characteristic of the comparison product of Example 3 is strongly nonuniform and cannot be accurately detected by measuring procedures. As far as measured values can at all be obtained, these are far longer than efflux times of the products of this invention.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the preparation of discrete, finely divided, tack-free, pourable, powdery filler-containing elastomer particles containing a plasticizing amount of a mineral oil plasticizer from an admixture of
    a. an aqueous emulsion of a vulcanizable elastomer consisting essentially of (i) a solution of a vulcanizable elastomer dissolved in a volatile, inert organic solvent, (ii) an elastomer-emulsifying amount of an amine surfactant, and (iii) water, and
    b. an aqueous dispersion consisting essentially of a filler emulsifying amount of an amine surfactant and 20 –500% by weight, based on the weight of said elastomer, of a solid, finely divided elastomer filler, which process includes introducing said admixture into an aqueous alkali silicate precipitation bath and simultaneously evaporating said elastomer solvent to form said filler-containing elastomer particles, the improvement which comprises:
    employing as the filler of said component (b) a free-flowing, pulverulent premix consisting essentially of 1–100 parts by weight, per 100 parts by weight of said filler, of a mineral oil plasticizer absorptively bound thereto.

2. A process according to claim 1, wherein the amount of adsorbed plasticizing oil is 30–60 parts by weight per 100 parts by weight of filler.

3. A process according to claim 1, wherein the vulcanizable elastomer is selected from the group consisting of polybutadienes, copolymers of butadiene and styrene, ethylene-propylene copolymers and EPDM copolymers.

4. A process according to claim 3, wherein the vulcanizable elastomer is a homopolymer of butadiene having a vinyl content of 25–50%.

5. A process according to claim 3, wherein the filler is carbon black.

6. A process according to claim 3, wherein the filler is active silicic acid.

7. A process according to claim 3, wherein the plasticizing oil is chiefly an aromatic hydrocarbon.

8. A process according to claim 3, wherein the filler is carbon black having 30–60 parts by weight of an aromatic plasticizing oil adsorbed thereon per 100 parts by weight of filler.

9. A process according to claim 1, wherein the admixture is precipitated by reaction at a temperature of about 40°–90°C with an aqueous sodium silicate solution containing 0.25–6 moles of $SiO_2$ per mole of emulsifiers.

10. A process according to claim 1, wherein the amine surfactant is an alkylamineoxyethylate of the formula

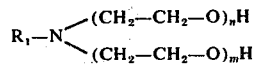

wherein $R_1$ is alkyl or alkenyl of 10–20 carbon atoms and $n$ and $m$ are each integers of 6 to 20 inclusive.

11. A process according to claim 10, wherein the emulsifier is employed in an amount of 0.05–2.0 wt. % based on the weight of elastomer in solution and 0.1–6.0 wt. % based on the weight of the plasticizer-adsorbed filler.

12. A process according to claim 11, wherein the molar ratio of $Na_2:SiO_2$ in the sodium silicate precipitant is about 2:1 to 4:1.

13. A process according to claim 12, wherein the precipitant bath further comprises 1–20 moles of sulfuric acid per mole of emulsifier.

* * * * *